(12) United States Patent
Sullivan

(10) Patent No.: US 7,472,940 B2
(45) Date of Patent: Jan. 6, 2009

(54) UNIVERSAL INSTRUMENT MOUNT

(76) Inventor: John Timothy Sullivan, 11339 Barley Field Way, Marriottsville, MD (US) 21104-1346

( * ) Notice: Subject to any disclaimer, the term of this patent is extended or adjusted under 35 U.S.C. 154(b) by 276 days.

(21) Appl. No.: 11/545,454

(22) Filed: Oct. 11, 2006

(65) Prior Publication Data

US 2008/0088148 A1 Apr. 17, 2008

(51) Int. Cl.
*B62D 25/14* (2006.01)
(52) U.S. Cl. .............................. 296/72; 296/70; 180/90; 248/27.1; 248/27.5
(58) Field of Classification Search .................. 296/70, 296/72; 180/90; 248/27.1, 27.5
See application file for complete search history.

(56) References Cited

U.S. PATENT DOCUMENTS 5,735,493 A * 4/1998 Ditch ......................... 248/27.1
7,243,882 B2 * 7/2007 Day et al. ................... 248/27.1

OTHER PUBLICATIONS

Web-based Product Brochure entitled "Banks Dynafact Gauges" [www]galebanksengineering.com/dyno_testing/dynafact. cfm—downloaded Aug. 13, 2006.

* cited by examiner

*Primary Examiner*—Lori L Lyjak
(74) *Attorney, Agent, or Firm*—Bacon & Thomas, PLLC

(57) ABSTRACT

A bracket enables mounting of non-standard sized or shaped instruments in openings of a standard pillar mount or similar instrument mounting arrangement. The bracket includes a first extension that fits in a standard opening and a second extension that mounts the instrument at a position offset from the standard opening.

12 Claims, 5 Drawing Sheets

UNIVERSAL INSTRUMENT MOUNT

BACKGROUND OF THE INVENTION

1. Field of the Invention

This invention relates to apparatus for mounting instruments of various types and sizes in a motor vehicle, and in particular to an arrangement for mounting instruments on the A-pillar of a car or truck. The arrangement is in the form of an adapter that includes a portion arranged to fit into a standard opening of a pillar mount, and that accommodates different size instruments by also including an instrument-receiving portion that is offset from the portion arranged to fit into the pillar mount opening.

2. Description of Related Art

FIG. 1 shows a currently-available instrument mounting arrangement made up of a mounting structure 1 that attaches to the A-pillar of a motor vehicle and that includes a plurality of openings into which may be fitted instruments and/or gauges having a circular cross-section and an appropriate diameter. This arrangement enables vehicle owners to install the instruments and/or gauges without having to cut holes in the A-pillar, and yet obtain a professional or factory installed appearance.

By way of background, the A-pillar extends substantially vertically on the side of the windshield in a car or truck. By mounting instruments on the A-pillar, the instruments can easily be viewed by the driver without obstructing the driver's view of the road, and without forcing the driver to look down away from the road. Instruments that are conventionally mounted in a pillar mount include, by way of example, tachometers, boost gauges for measuring turbocharger performance, pyrometers for measuring exhaust gas temperatures, and engine oil temperature gauges.

One limitation of the conventional pillar mount arrangement is that it only fits a single instrument or gauge size. While the hole size can be varied to fit different instruments, once the hole size is established, so is the instrument/gauge size. It is not possible to replace an instrument with an instrument requiring a different size opening.

In addition, the conventional pillar mount arrangement only support instruments with a predetermined shape. Once the pillar mount is installed, the purchaser can only mount instruments having the predetermined shape. Thus instruments that require a larger size or different shape, such as a GPS navigation system, cannot be mounted on the conventional pillar mount.

SUMMARY OF THE INVENTION

It is accordingly a first objective of the invention to provide an arrangement that enables instruments or gauges of different sizes and shapes to be mounted in a conventional pillar mount having instrument-receiving openings with a fixed dimension.

It is a second objective of the invention to enable instruments or gauges of different sizes and shapes to be mounted without the need for any cutting or special tools.

These objectives are achieved, in accordance with the principles of a preferred embodiment of the invention, by mounting the instrument or gauge to a bracket that offsets the instrument or gauge from the mounting hole in the pillar mount. The bracket includes a cylindrical portion arranged to fit into a hole in the pillar mount and to be secured thereto by any convenient means, such as a simple interference or pressure fit, and a second offset portion arranged to be attached to the instrument.

The second offset portion may be a circular bracket arranged to receive the threaded cylindrical stem of an instrument, the threaded stem being held in place by an internally threaded nut or cup. Alternatively, the second offset portion may be in the form of, or may accommodate, a bracket arranged to be screwed onto or otherwise fastened to the instrument. In addition, in order to help prevent rotation of the instrument relative to the bracket, an o-ring or gasket may optionally be added to generate friction between the mounting bracket and the part that secures the instrument or gauge.

By offsetting the instrument mount, the instrument or gauge may be designed to have a larger diameter than a conventional gauge, without interference from the pillar mount. In addition, by separating the instrument mounting hole from the pillar mounting hole, the bracket can be arranged to accommodate different instrument shapes and mounting configurations.

DETAILED DESCRIPTION OF THE PREFERRED EMBODIMENTS

Figure 1:
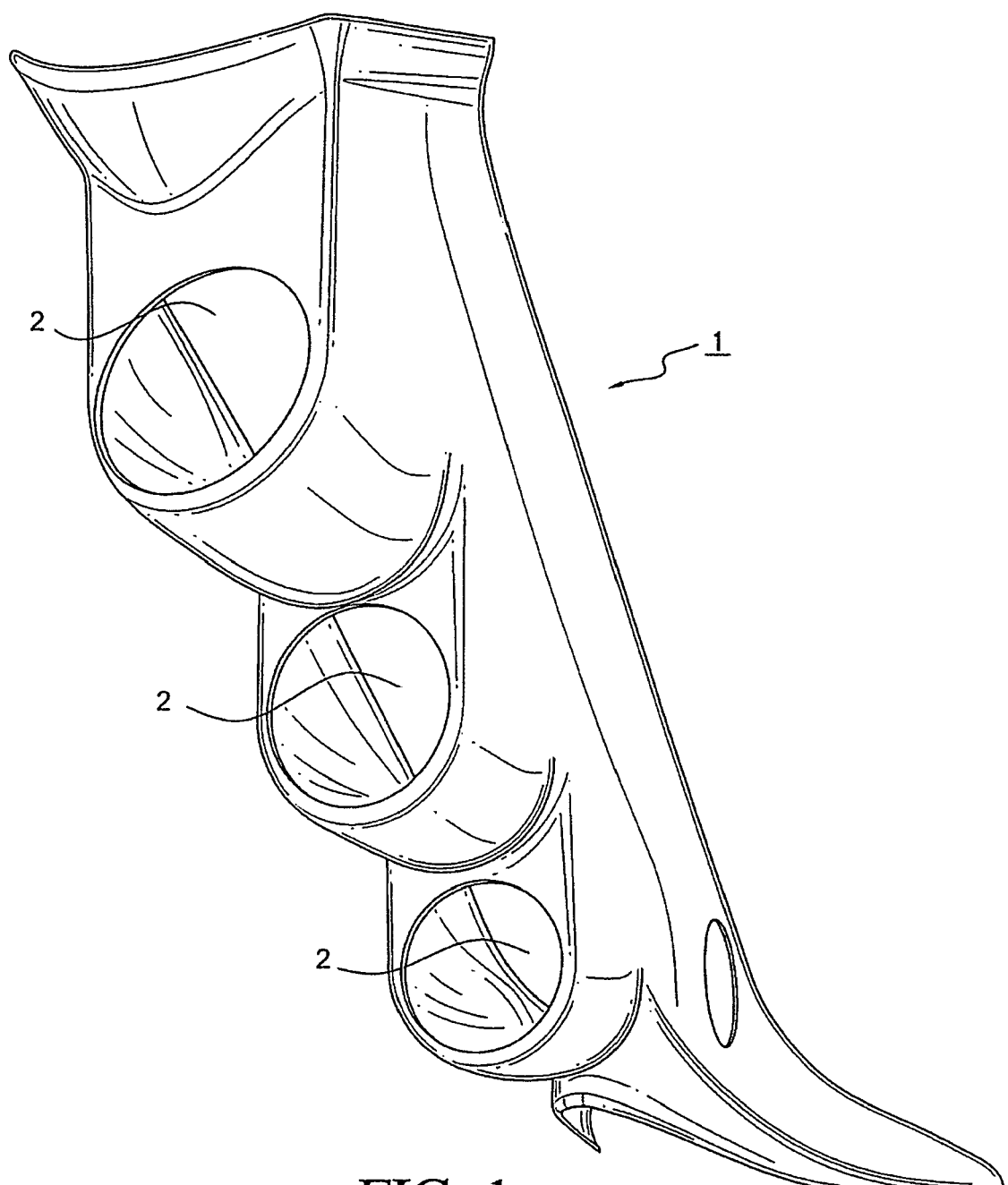
FIG. 1 is an isometric view of a pillar mount manufactured by Pro Parts LLC, and with which the present invention may be used.
Figure 2:
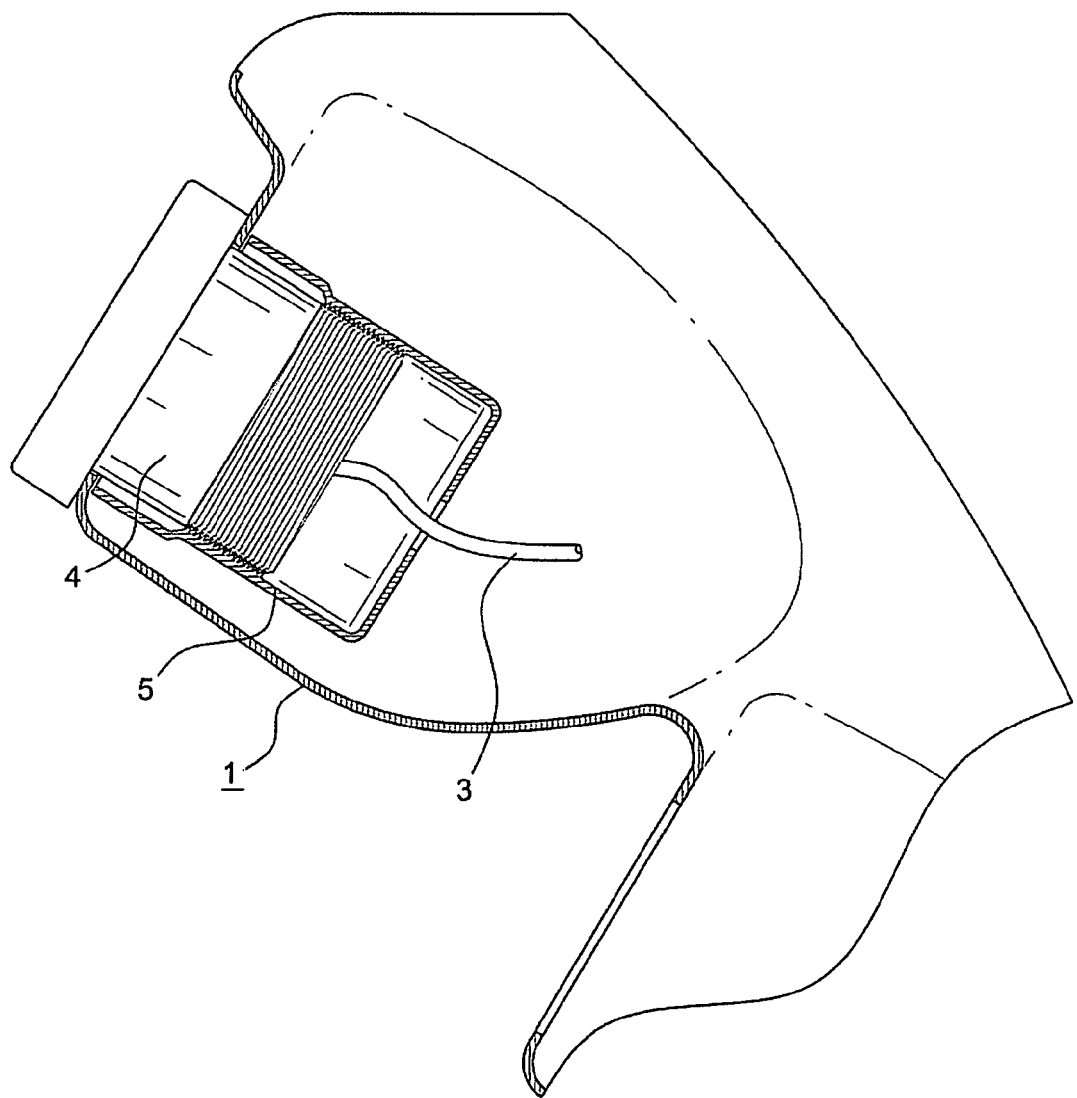
FIG. 2 is an cross-section view of the mounting arrangement of FIG. 1.

The pillar mount shown in FIGS. 1 and 2 is a commercially available pillar mount that may be used with the claimed invention. It includes a main body 1 arranged to be fitted over and secured to the A-pillar of a car or truck. The shape of the pillar mount main body 1 depends on the shape of the A-pillar in the particular vehicle for which the pillar mount is intended, but in general the main body is a molded structure that includes room for both the A-pillar and wires 3 leading from instruments or gauges 4. Instruments or gauges 4 may be mounted in the opening 2 by means of an internally-threaded cup or nut 5, as shown in FIG. 2. The structure of the main body 1 and openings 2 is illustrated for purpose of context, and is not a part of the present invention. Suitable hardware or other means for mounting the main body 1 in a vehicle is well known and not illustrated herein.

Figure 3:
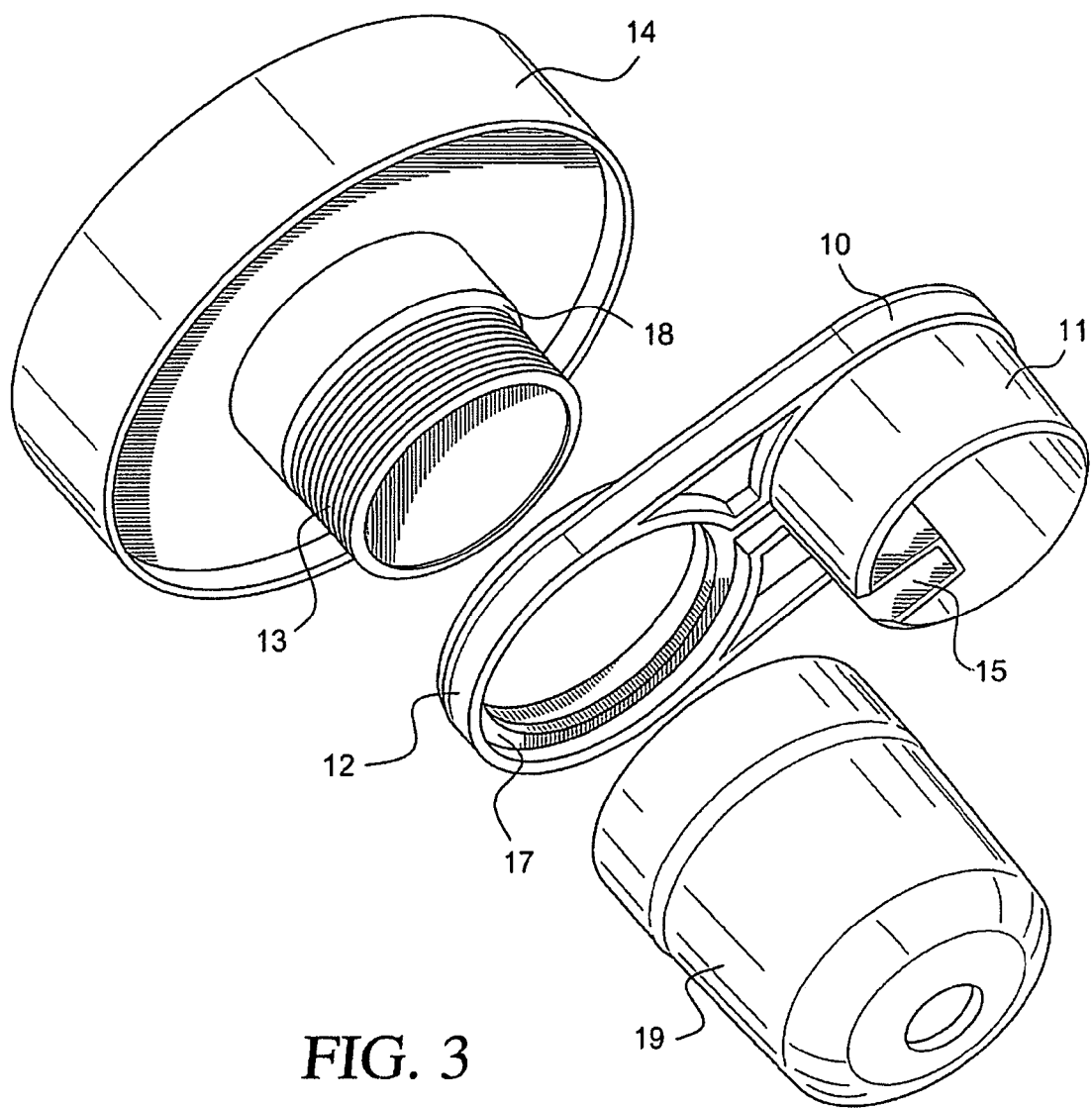
FIG. 3 is an isometric view of an instrument or gauge mounting arrangement that utilizes the principles of a preferred embodiment of the invention.
Figure 4:
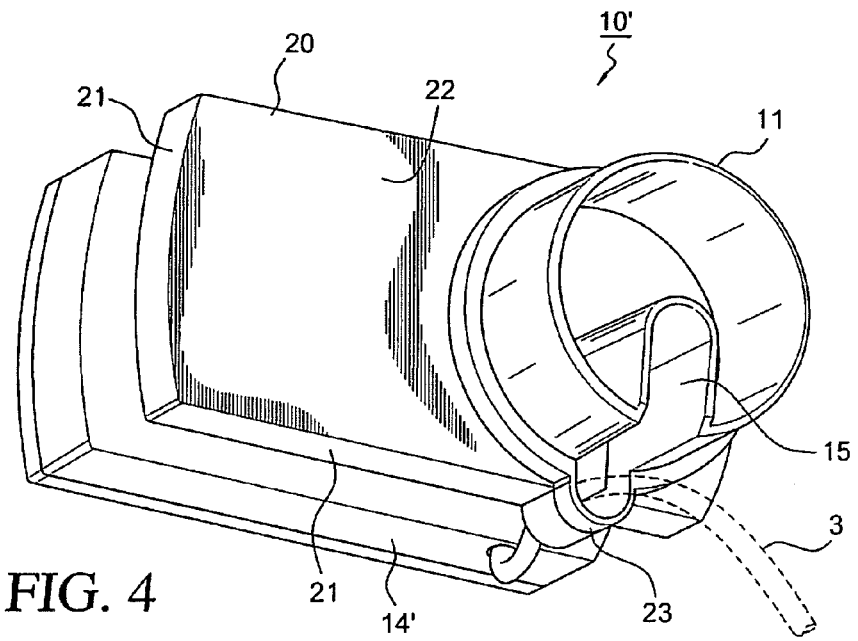
FIG. 4 is an isometric view of an alternative instrument or gauge mounting arrangement that may be used instead of or in addition to the mounting arrangement of FIG. 3.
Figure 5:
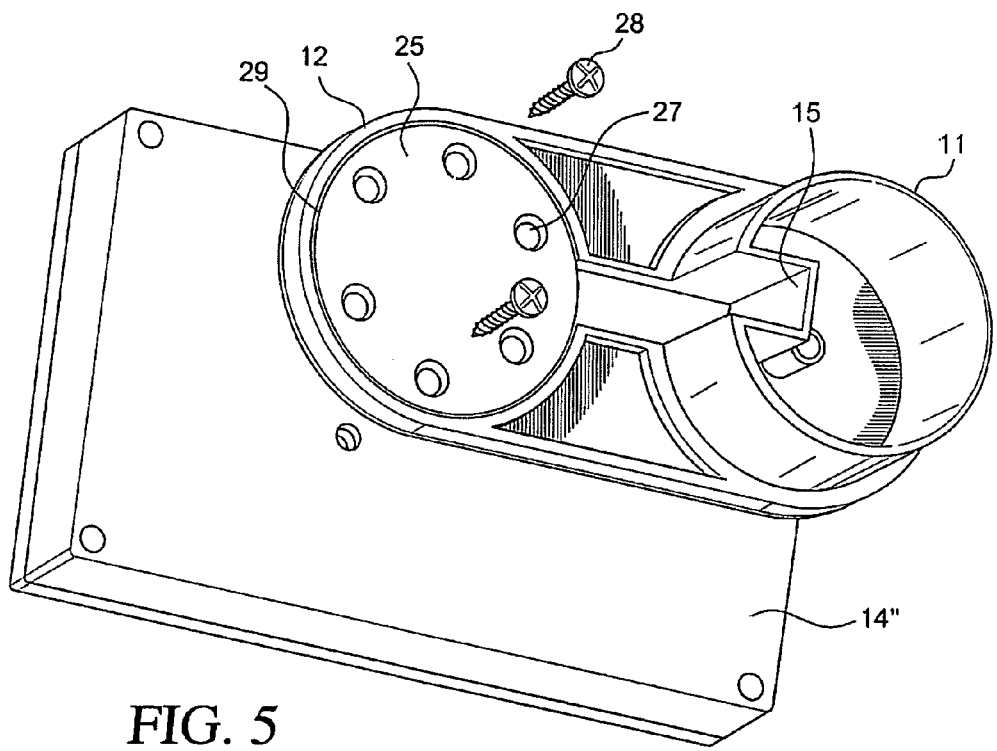
FIG. 5 is an isometric view of another alternative instrument or gauge mounting arrangement that may be used instead of or in addition to the mounting arrangement of FIGS. 3 and 4.

It will be appreciated by those skilled in the art that the adapter or bracket of the invention may be used with pillar mounts other than the one illustrated in FIGS. 1 and 2, and that it may in addition be used with instrument mounts other than pillar mounts, so long as the instrument mount includes openings corresponding to openings 2 into which the instruments are conventionally inserted, and through the adapter of the invention may instead be inserted according to the principles discussed below in connection with FIGS. 3-5.

As is apparent from FIG. 1, because of the curvature of the body 1, which is necessary to accommodate a typical A-pillar, it is not possible to increase the size of the instrument that can be mounted to the main body 1 of the pillar mount. In contrast, as illustrated in FIGS. 3-5, the mounting arrangement of the present invention can accommodate a wide variety of instrument sizes and shapes. For example, as illustrated in FIG. 3, the mounting arrangement of the invention includes a bracket 10 having a first extension 11 for insertion into one of the openings 2 of the pillar mount body 1 of FIGS. 1 and 2, or corresponding openings of another instrument/gauge mounting structure. In addition, bracket 10 includes a second extension 12 provided with a circular opening for receiving a cylindrical mounting structure 13 of an instrument 14 that would be too large to fit in the space provided by the main body 1 if it were not offset by the extension 12.

The first extension 11 is cylindrical and dimensioned to provide an interference fit when inserted into the opening 2 of body 1 of the pillar mount illustrated in FIG. 1, or into the corresponding opening of another pillar mount. It is also within the scope of the invention to provide a clamp, threads and a nut or internally-threaded cup, or other means for securing the first extension 11 to the pillar mount. Preferably, first extension 11 includes a slot 15 for accommodating wires (not shown) extending from the rear of the instrument. The wires extend through the slot 15 and inside the pillar mount for connection with the appropriate sensors or other electronics in the dashboard or engine of the vehicle in conventional fashion.

The second extension 12 includes a rim or shoulder 17 for positioning a corresponding shoulder 18 on the instrument 14. A threaded portion of the cylindrical mounting structure 13 of instrument 14 extends through the circular bracket for mating with a cup or nut 19 having internal threading so that the cup can be threaded onto the extension 13 of the instrument to secure the instrument 14 in place without the need for special tools. The bracket 10 may additionally be locked in place against rotation by press fit pins, set screws, or other fasteners.

FIG. 4 shows an alternative 10' to the bracket 10 of FIG. 3, in which the instrument mounting section 20 of the adapter is rectangular and sized to accommodate a rectangular instrument 14' such as, for example, a GPS navigation system. The bracket has the same shape as the instrument, including four walls 21 extending perpendicularly to a planar base 22 into which the instrument may be snapped or otherwise secured. The first extension 11 for mounting the bracket to the opening 2 of the pillar mount of FIG. 1, or into the corresponding opening of another instrument mounting structure, may be identical to that shown in FIG. 3. A fitting 23 may be added to hold wires 3 extending from the side of the instrument, which may then be positioned in the slot 15 of the mounting extension 11 so as to pass into the interior space of the pillar mount main body. The slot 15 may be positioned identically to that shown in FIG. 3, or situated at a different angle or location to accommodate a wire configuration.

FIG. 5 shows a second alternative to the bracket of FIG. 1, in which the instrument-mounting extension 12 of the bracket is arranged to accommodate a circular plate 25. The circular plate 25 includes openings 27 for accommodating screws or other fasteners 28 used to secure the instrument 29 to the bracket, and may either be a separate structure that may be used with a bracket identical to the one shown in FIG. 3, or that may be integral with the instrument-mounting extension 12. The first extension 11 used to mount the bracket to a pillar mount or other instrument mounting structure is preferably identical to the ones shown in FIGS. 3 and 4. This configuration permits instruments, such as LCD monitors, that are substantially larger than the bracket itself to be mounted on the bracket, and therefore to the pillar mount main body 1 with standard circular openings.

If the plate 25 of FIG. 5 is a separate element, a gasket 29 made of a suitably resilient material may be included to create friction between the plate and the bracket to prevent unintentional rotation of the instrument. Such a gasket may be used in connection with any of the embodiments of the invention to help secure the instrument or bracket against rotation within a circular opening.

Figure 6:
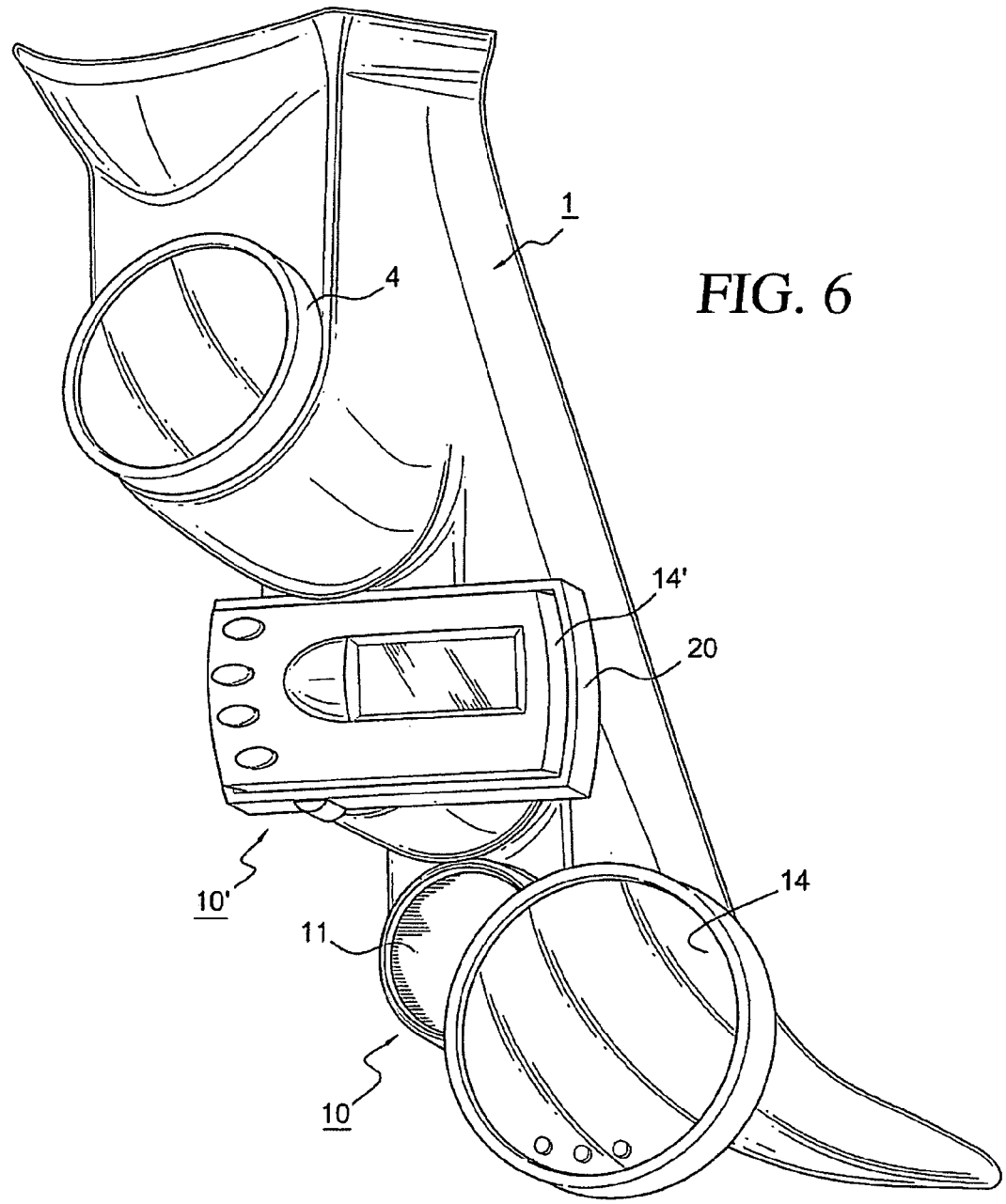
FIG. 6 is an isometric view of the panel of FIG. 1, to which instruments have been mounted using the arrangements illustrated in FIGS. 3-5.

Finally, FIG. 6 illustrates use of the mounting arrangement of the preferred embodiments to mount a variety of instruments on a pillar mount body. These instruments include the instrument 4 of FIG. 2, and the instruments 14' and 14" of FIGS. 3 and 4, which are too large to be mounted on the conventional pillar mount without the bracket arrangements of FIGS. 3-5.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention. For example, the bracket of the invention may be used in connection with instrument mounts other than those intended for vehicles other than cars or trucks, or even instruments for machinery or apparatus other then vehicles. In addition, the shapes and sizes of the first and second extensions may be freely varied to accommodate different instruments and mounting configurations. It is therefore intended that the invention not be limited by the above description or accompanying drawings, but that it be defined solely in accordance with the appended claims.

What is claimed is:

1. An arrangement for mounting an instrument to a main body of an instrument mount having at least one opening, said instrument having a size or shape that prevents it from being mounted directly into the opening, comprising:
   a bracket having a first extension arranged to extend into the opening to secure the bracket to the main body; and
   a second extension arranged to accommodate said instrument at a position offset from said opening.

2. An instrument mounting arrangement as claimed in claim 1, wherein said opening is circular and said first extension is cylindrical.

3. An instrument mounting arrangement as claimed in claim 2, wherein said first extension includes a slot for permit passage of wires from the instrument to an interior of the main body.

4. An instrument mounting arrangement as claimed in claim 2, wherein said second extension includes a circular opening for accommodating said instrument.

5. An instrument mounting arrangement as claimed in claim 4, wherein a circular plate is fixed to said second extension, said circular plate including openings for receiving fasteners that mount the instrument to the bracket irrespective of the shape of the instrument.

6. An instrument mounting arrangement as claimed in claim 4, wherein said instrument is mounted to said second extension by threading a cup or nut onto a cylindrical mounting portion of said instrument.

7. An instrument mounting arrangement as claimed in claim 2, wherein said instrument is non-circular and said second extension has a corresponding non-circular shape.

8. An instrument mounting arrangement as claimed in claim 1, wherein said first extension includes a slot for permit passage of wires from the instrument to an interior of the main body.

9. An instrument mounting arrangement as claimed in claim 1, wherein said second extension includes a circular opening for accommodating said instrument.

10. An instrument mounting arrangement as claimed in claim 9, wherein a circular plate is fixed to said second extension, said circular plate including openings for receiving fasteners that mount the instrument to the bracket irrespective of the shape of the instrument.

11. An instrument mounting arrangement as claimed in claim 9, wherein said instrument is mounted to said second extension by threading a cup or nut onto a cylindrical mounting portion of said instrument.

12. An instrument mounting arrangement as claimed in claim 1, wherein said instrument is non-circular and said second extension has a corresponding non-circular shape.

* * * * *